US006817215B1

(12) United States Patent
Chen

(10) Patent No.: US 6,817,215 B1
(45) Date of Patent: Nov. 16, 2004

(54) STEERING WHEEL LOCK

(75) Inventor: An-Hung Chen, Tainan Hsien (TW)

(73) Assignee: Meng-Fu Chen, Taichung Hsien (TW)

( * ) Notice: Subject to any disclaimer, the term of this patent is extended or adjusted under 35 U.S.C. 154(b) by 0 days.

(21) Appl. No.: 10/681,944

(22) Filed: Oct. 10, 2003

(51) Int. Cl.[7] ............................................ B60R 25/02
(52) U.S. Cl. ............................ 70/209; 70/25; 70/333 R
(58) Field of Search ......................... 70/209–212, 237, 70/238, 225, 226, 301, 312, 321, 329, 330, 332, 333 R

(56) References Cited

U.S. PATENT DOCUMENTS

| | | | | |
|---|---|---|---|---|
| 98,622 A | * | 1/1870 | Sargent | 70/333 R |
| 1,940,789 A | * | 12/1933 | Diaz | 70/25 |
| 2,430,711 A | * | 11/1947 | Dusterwald | 70/333 R |
| 2,970,217 A | * | 1/1961 | Enikeieff | 250/515.1 |
| 3,237,435 A | * | 3/1966 | Paul | 70/323 |
| 3,776,006 A | * | 12/1973 | Atkinson | 70/74 |
| 4,040,280 A | * | 8/1977 | Main et al. | 70/333 R |
| 4,616,492 A | * | 10/1986 | Barfield | 70/284 |
| 5,193,367 A | * | 3/1993 | Ling | 70/28 |
| 5,701,772 A | * | 12/1997 | Wang | 70/284 |
| 5,890,382 A | * | 4/1999 | Wang | 70/209 |
| 6,176,109 B1 | * | 1/2001 | Tsui | 70/25 |
| 6,615,626 B2 | * | 9/2003 | Yu et al. | 70/301 |
| 6,675,614 B2 | * | 1/2004 | Lai | 70/25 |
| 6,729,166 B1 | * | 5/2004 | Lai | 70/25 |
| 2003/0074937 A1 | * | 4/2003 | Shafirkin | 70/333 R |
| 2004/0099025 A1 | * | 5/2004 | Wang | 70/209 |

* cited by examiner

Primary Examiner—Suzanne Dino Barrett

(57) ABSTRACT

A steering wheel lock comprises a lock mount, a retaining rod, a combination lock, a lock knob, a lock sleeve, a retractable rod and a pin set. The double locking function provided by the combination lock and the lock knob makes decoding much more difficult. It is an additional locking mechanism that a pin set composed of a long pin and two short pins can be inserted into the pin holes within the combination lock. An extra code set specifying the alignment configuration of the pin holes is then needed to open the lock.

4 Claims, 10 Drawing Sheets

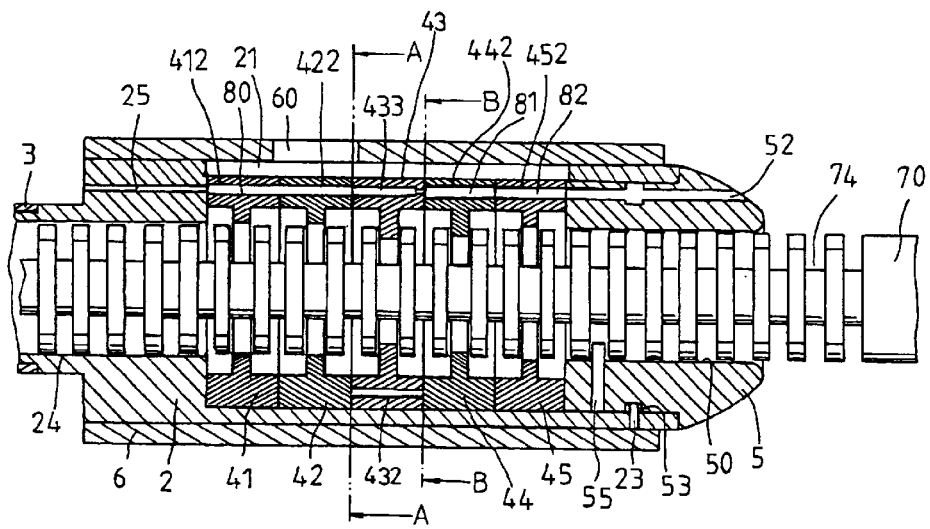
FIG.5
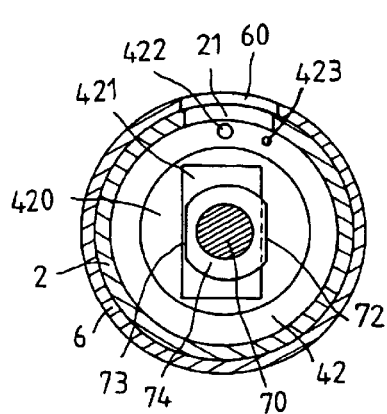  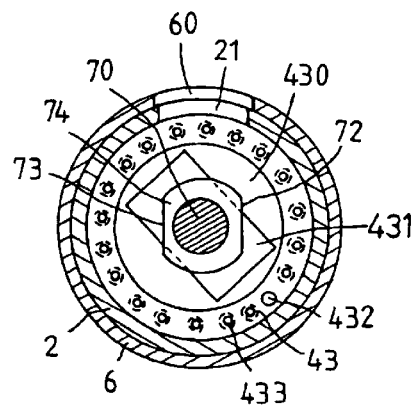
FIG.6   FIG.7

STEERING WHEEL LOCK

BACKGROUND OF THE INVENTION

1. Field of the Invention

The present invention relates to steering wheel locks, and more particularly to a steering wheel lock comprising a lock mount, a retaining rod, a combination lock, a lock knob, a lock sleeve, a retractable rod and a pin set. Besides the double locking mechanisms of the combination lock and the lock knob, a pin set can be inserted into pin holes within the combination lock for an extra locking function, especially suitable for providing anti-theft measure for long-term parking.

2. Description of the Prior Art

A steering wheel lock of the prior art, as shown in FIG. 1, comprises a main body 1 underneath a hook member 10 is attached. The main body 1 is further is provided a lock core on the top face thereof and a handle 12 on a lateral side thereof. A through hole 13 is formed on another side of the main body 1 for receiving a retractable rod 14. The retractable rod 14 is provided with a hook member 15 at one end and a plurality of engaging grooves 16.

To use the steering wheel lock, it is placed over a steering wheel, and the hook member 10 is then engaged with the inner rim of the steering wheel. The retractable rod 14 is pulled out from the main body 1 till the hook member 15 is also engaged with the inner rim of the wheel on the opposite side. The blocking arms of the main body 1 extend into the space between the steering wheel and the driver's seat so that the rotational range of the wheel is restricted, achieving an anti-theft effect.

However, the conventional steering wheel locks are vulnerable to strong striking force applied at the retractable rod 14 and the main body 1 in the inward direction, which may causes the parts in the lock core to break, therefore losing the locking function. It is a further disadvantage that a key is necessary to unlock the lock. The user has to take extra efforts to keep the key.

SUMMARY OF THE INVENTION

Accordingly, the primary object of the present invention is to provide a steering wheel lock having multiple locking mechanisms. The steering wheel lock comprises a lock mount, a retaining rod, a combination lock, a lock knob, a lock sleeve, a retractable rod and a pin set. The double locking function provided by the combination lock and the lock knob makes decoding much more difficult. It is an additional locking mechanism that a pin set composed of a long pin and two short pins can be inserted into the pin holes within the combination lock. An extra code set specifying the alignment configuration of the pin holes is then needed to open the lock.

More specifically, the lock mount is provided with a receptacle and a window. A first pin hole for receiving a retaining pin is further provided at an open first end of the lock mount. A first through hole connecting the receptacle is formed at a closed second end of the lock mount. A mark is formed on an outer lateral wall of the lock mount at the open first end. The retaining rod substantially mounted on the second end of the lock mount, which consists of a first rod member and a first hook member. A second through hole is coaxially formed within the rod member. The combination lock mounted within the lock mount is composed of a plurality of rotary blocks, each of the rotary blocks being provided with an ingrowing plate having a third through hole whose center is slightly off the center of the corresponding rotary block. A set of numeric marks is formed around an outer round wall of each of the rotary blocks. The lock knob provided with a fourth through hole is mounted on the first end of the lock mount. A numeric mark set is provided on a lateral side of the lock knob about the fourth through hole. An annular groove is formed around an outer round wall of the lock knob. A second pin hole going into the fourth through hole for receiving a fixing pin is formed on the outer round wall of the lock knob. A retractable rod going through the lock mount into the retaining rod consists of a second rod member and a second hook member. The second rod member has a wide lateral face and a narrow lateral face and therefore a non-symmetrical cross-section. The second rod member being further provided with a plurality of annular grooves.

The various objects and advantages of the present invention will be more readily understood from the following detailed description when read in conjunction with the appended drawings.

BRIEF DESCRIPTION OF DRAWINGS

FIG. 5 is a cross-sectional view showing the interior of the lock mount.

FIG. 6 is a cross-section view of the lock mount along the A—A cut line according to FIG. 5.

FIG. 7 is a cross-section view of the lock mount along the B—B cut line according to FIG. 5.

DETAILED DESCRIPTION OF THE PREFERRED EMBODIMENTS

Figure 1:
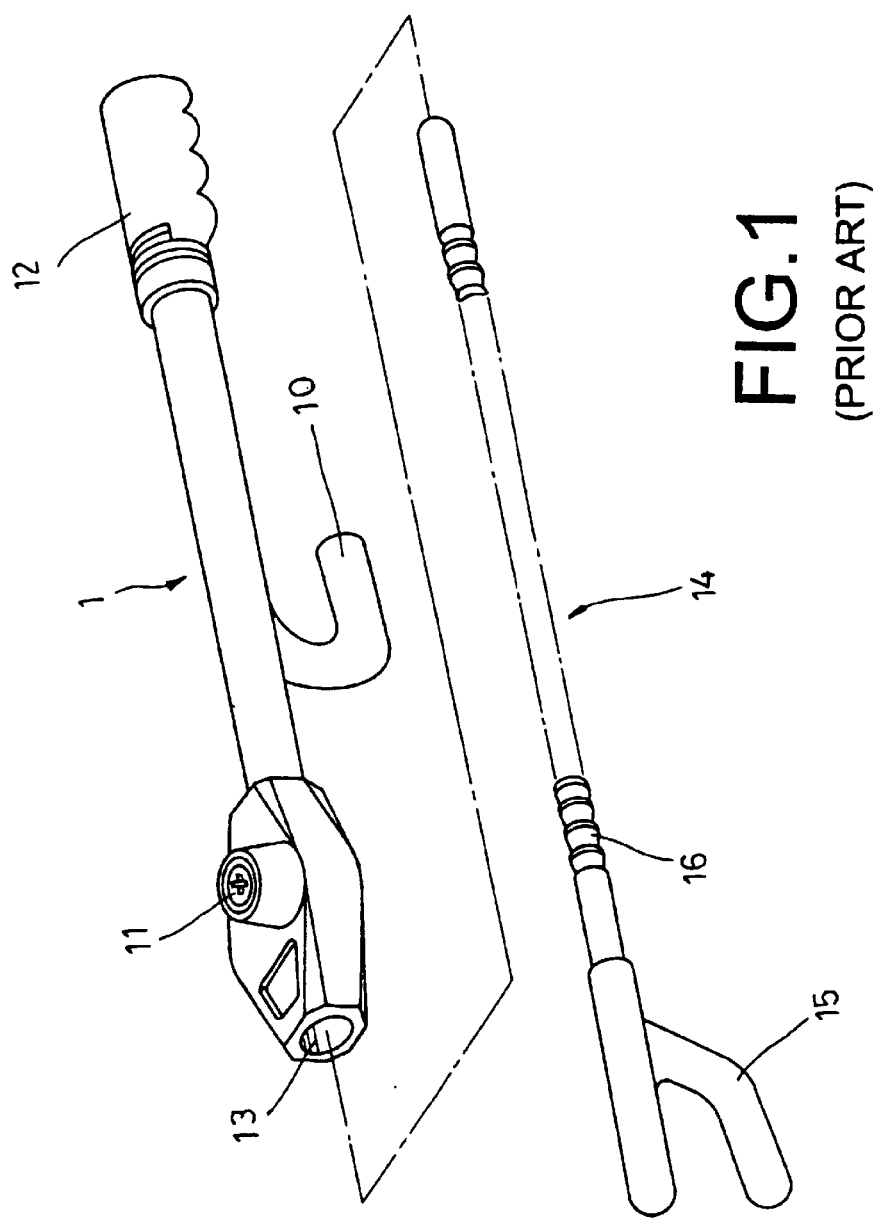
FIG. 1 is an exploded perspective view of a conventional steering wheel lock.

Referring to FIGS. 2, 3, 4 and 5, the present invention comprises a lock mount 2, a retaining rod 3, a combination lock 4, a lock knob 5, a lock sleeve 6, a retractable rod 7 and a pin set 8.

The lock mount 2 is substantially cylindrical, having an open first end and a closed second end that contains a through hole 24; the through hole 24 is coaxial with the axis of the lock mount 2. The interior portion of the lock mount 2 defines a receptacle 20. A window 21 is formed on the lateral round wall of the lock mount 2. The lateral wall of the lock mount 2 is further provided with a through hole 22 for receiving a retaining pin 23 and a mark 26, both locating at the first end of the lock mount 2 and roughly 90 degrees apart. The lateral wall of the lock mount 2 is further provided with a through hole 25, locating at the second end of the lock mount 2.

The retaining rod 3, composed of a rod member 30 and a hook member 31, is substantially mounted on the second end of the lock mount 2. The rod member 30 is a hollow cylinder, the interior portion of which defines a through hole 32.

The combination lock 4, composed of a first rotary block 41, a second rotary block 42, a third rotary block 43, a fourth rotary block 44 and a fifth rotary block 45, is mounted within the receptacle 20 of the lock mount 2. Each of the rotary blocks contains an ingrowing plate, which can be 410, 420, 430, 440 or 450. Each of the ingrowing plates is provided with a rectangular eccentric hole, which can be 411, 421, 431, 441 or 451. A lateral side of each of the rotary blocks is provided with a pin hole, which can be 412, 422, 432, 442 or 452. On the same lateral sides where the pin holes are located, the first rotary block 41 and the second rotary block 42 are further provided with false pin holes 413 and 423 respectively. The third rotary block 43 is provided with a plurality of false pin holes 433, circling around a lateral side thereof. A set of numeric marks, which can be 414, 424, 434, 444 or 454, is formed on the outer round wall of each of the rotary blocks.

The lock knob 5, substantially a cylindrical body, is mounted on the first end of the lock mount 2. The lock knob 5 has a coaxial through hole 50. On a lateral side of the lock knob 5 around the through hole 50, a numeric mark set 51 is provided. A pin hole 52 is formed on the numeric mark set 51, which goes through the lateral side wall of the lock knob 5. The outer round wall of the lock knob 5 is further provided with an annular groove 53 and a through hole 54 going into the through hole 50 for receiving a fixing pin 55.

The lock sleeve 6 encloses the lock mount 2 and is provided with five windows 60 on the lateral wall thereof. The windows 60 are longitudinally located according to the locations of the inner rotary blocks and transversely interlaced.

The retractable rod 7, composed of a rod member 70 and a hook member 71, is capable of being inserted through the lock mount 2 into the retaining rod 3. The rod member 70 takes a rectangular cross-section and therefore has a wide lateral face 72 and a narrow lateral face 73. The rod member 70 is further provided with a plurality of annular grooves 74. A pin hole 75 is formed at the end of the retractable rod 7 far from the hook member 71 for receiving a blocking pin 76.

The pin set 8 is composed of a long pin 80, two short pins 81, 82 and an ejection pin 83. The pin set 8 is for going through the pin holes 412, 422, 423, 442 and 452 of the combination lock 4.

Figure 2:
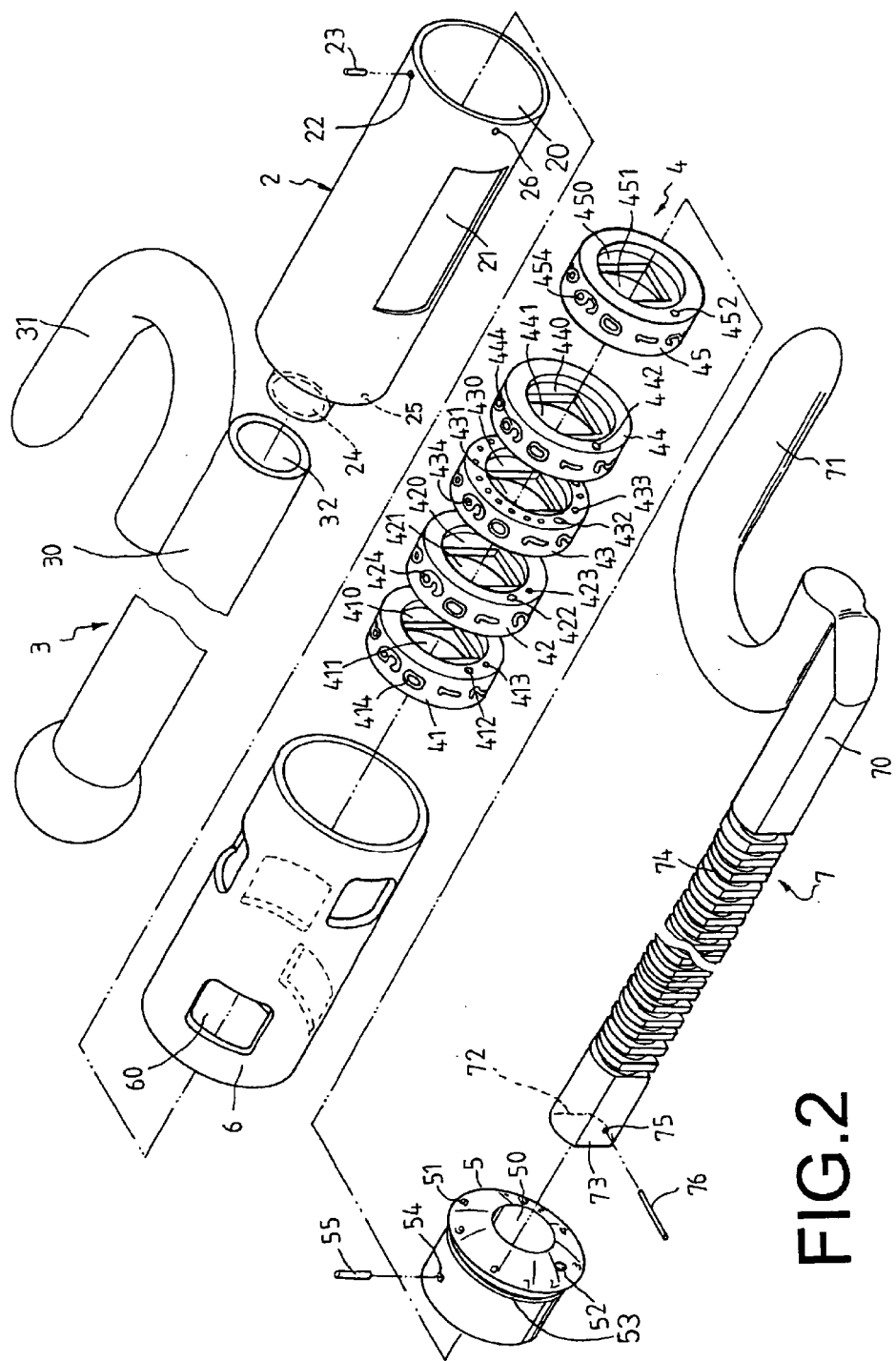
FIG. 2 is an exploded perspective view of the present invention.
Figure 3:
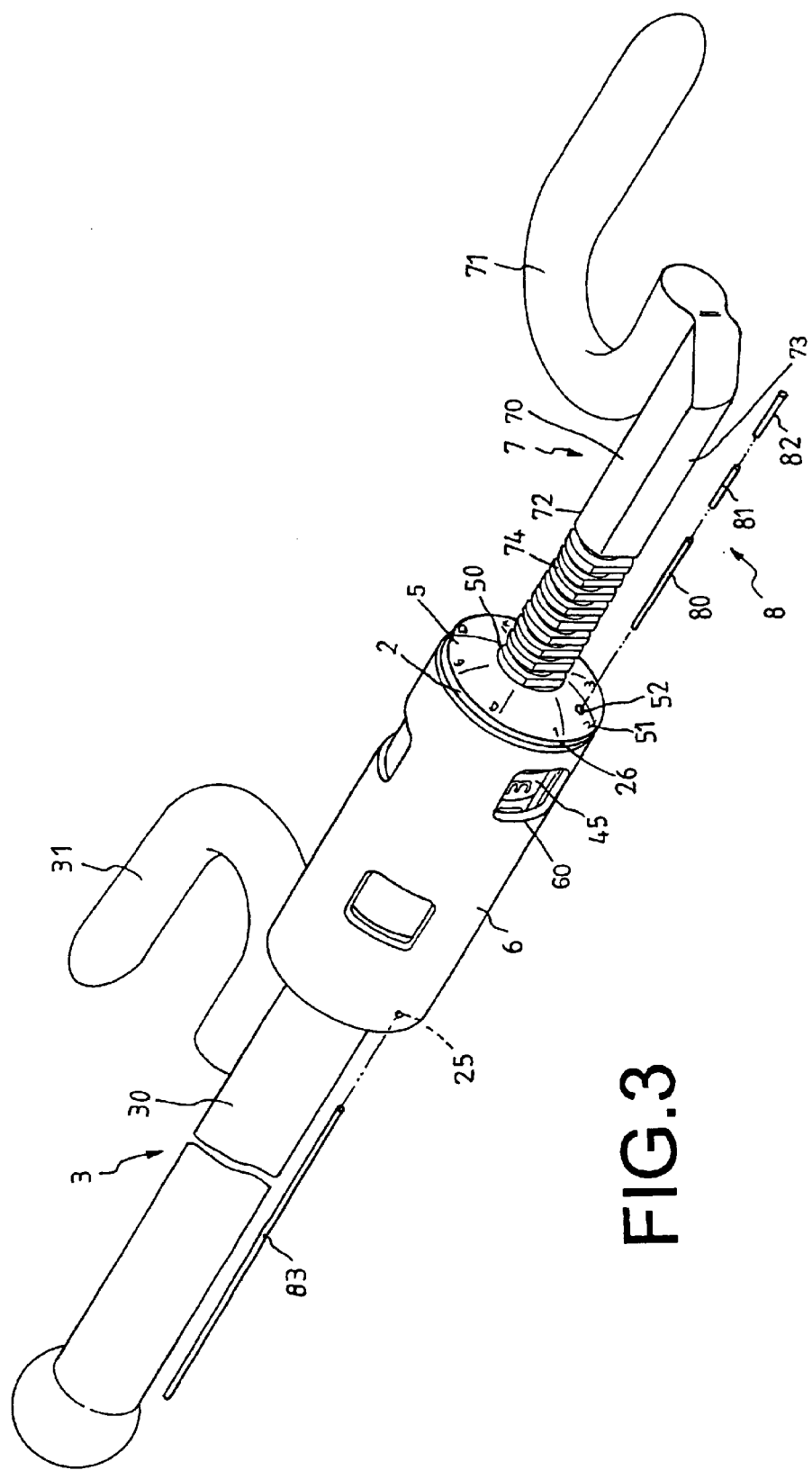
FIG. 3 is a perspective view of the present invention.
Figure 4:
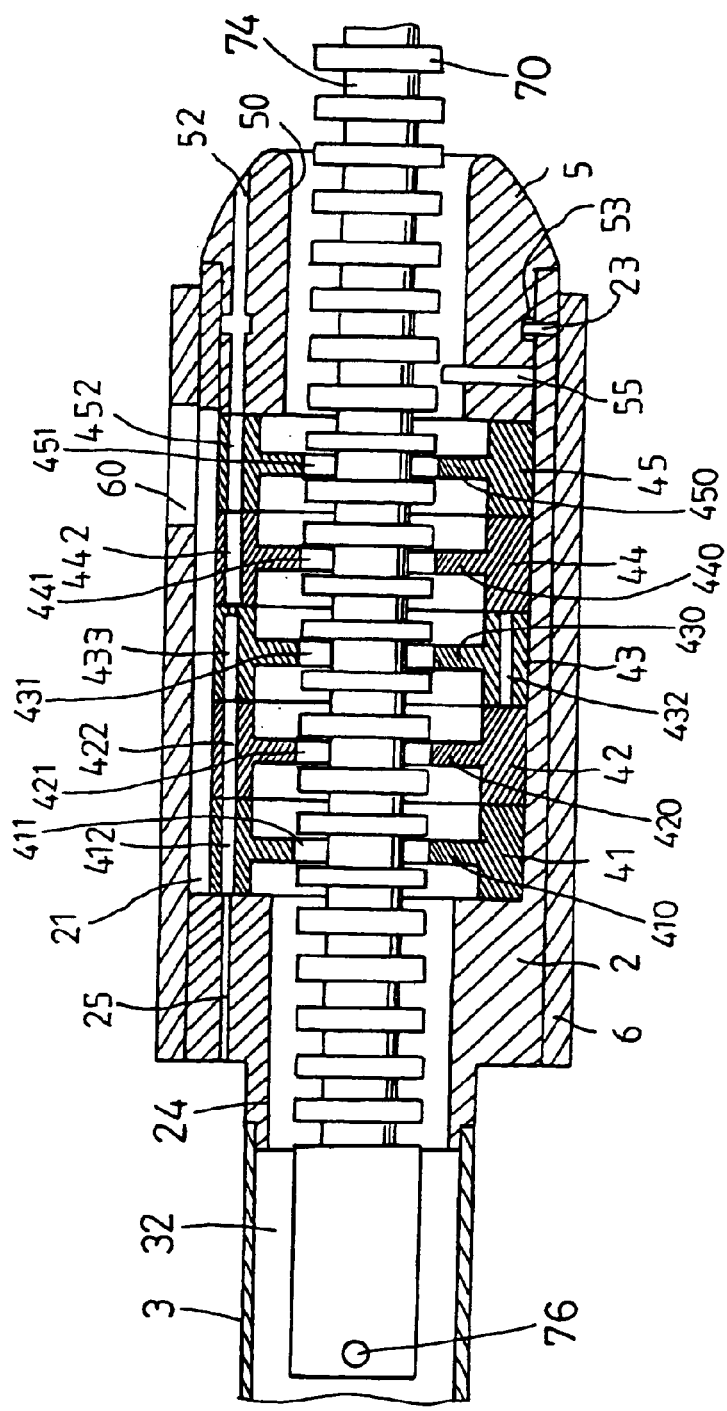
FIG. 4 is a cross-sectional view of the retractable rod of the present invention locked in the lock mount.

Refer to FIGS. 2, 3, and 4 for the assembly of a steering wheel lock according to the present invention. Firstly, the rotary blocks of the combination lock 4 are orderly placed into the receptacle 20 within the lock mount 2. The lock knob 5 is then mounted onto the open first end of the lock mount 2 by inserting the retaining pin 23 through the through hole 22 of the lock mount 2 into the annular groove 53 around the lock knob 5. The lock knob 5 is thus rotatably held at the first end of the lock mount 2. The lock sleeve 6 is put on the lock mount 2 to enclose the shell, and the retractable rod 7 is inserted through the through hole 50 of the lock knob 5, the eccentric holes 411, 421, 431, 441 and 451 of the rotary blocks in the lock mount 2, and the through hole 24 of the lock mount 2; the blocking pin 76 is then inserted into the pin hole 75 of the retractable rod 7 for retaining the retractable rod 7 in the lock mount 2. The retaining rod 3 is fixedly connected with the through hole 24 on the lock mount 2, so that the retractable rod 7 extends into the through hole 32 of the retaining rod 3. The steering wheel lock is thereby assembled.

Figure 8:
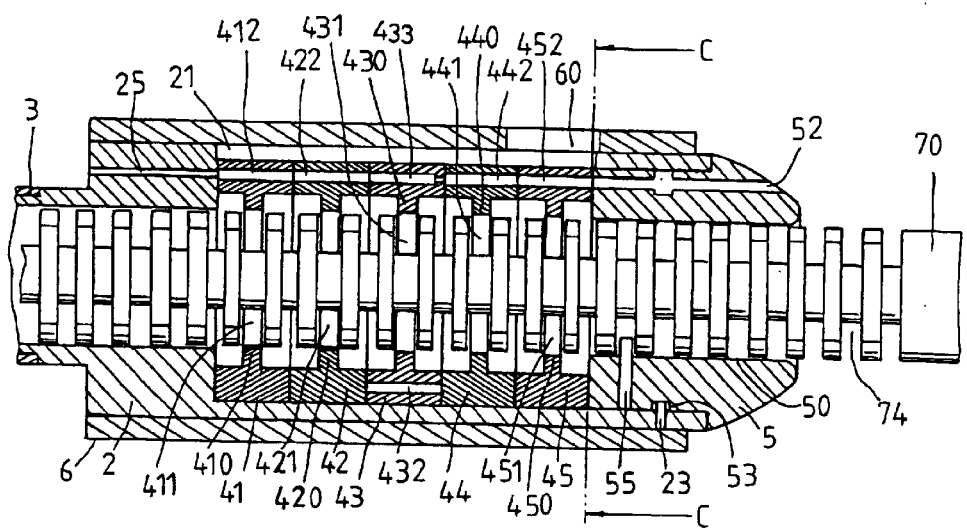
FIG. 8 is a cross-sectional view of the present invention wherein the rotary blocks are aligned whereas the lock knob is not.
Figure 9:
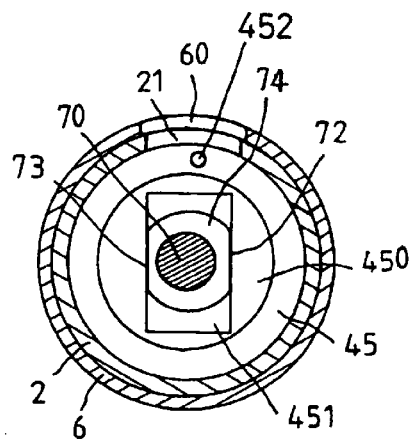
FIG. 9 is a cross-section view of the lock mount along the C—C cut line according to FIG. 8.

Refer to FIGS. 5, 6 and 7 for using the steering wheel lock. The lock sleeve 6 is firstly rotated so as to subsequently align the windows 60 with the rotary blocks exposed in the window 21 on the lock mount 2. Each of the rotary blocks 41 to 45 is turned to have the respective open code to appear in the respective window 60. The eccentric holes 411 to 451 in this rotary block configuration are mutually aligned, as shown in FIGS. 8 and 9. The lock knob 5 is then rotated to align a predetermined number 51 with the positioning mark 26 on the lock mount 2, by which the fixing pin 55 of the lock knob 5 is ejected from the section of annular grooves 74 to the wide lateral face 72, forming an unlocked state. The retractable rod 7 therefore can be pulled from the lock mount 2 to have the hook member 31 of the retaining rod 3 to engage with the inner rim of a steering wheel. The hook member 71 of the retractable rod 7 is hooked at the inner rim of the steering wheel on the opposite side. The rotary blocks of the combination lock 4 in the lock mount 2 are then randomly turned to other angular positions, and therefore the eccentric holes 411, 421, 431, 441 and 451 are aligned no more. As shown in FIG. 5, the ingrowing plates 410, 420, 430, 440 and 450 are engaged with the annular grooves 74 of the retractable rod 7, and the lock knob 5 is turned to another angular position so that the fixing pin 55 thereof is also engaged with a groove 74 of the retractable rod 7, completing the locking action. The double locking mechanisms by the combination lock 4 and the fixing pin 55 of the lock knob 5 presents a difficult task for a thief, because he or she has to decode the combination lock 4 and the lock knob 5 at the same time.

Figure 12:
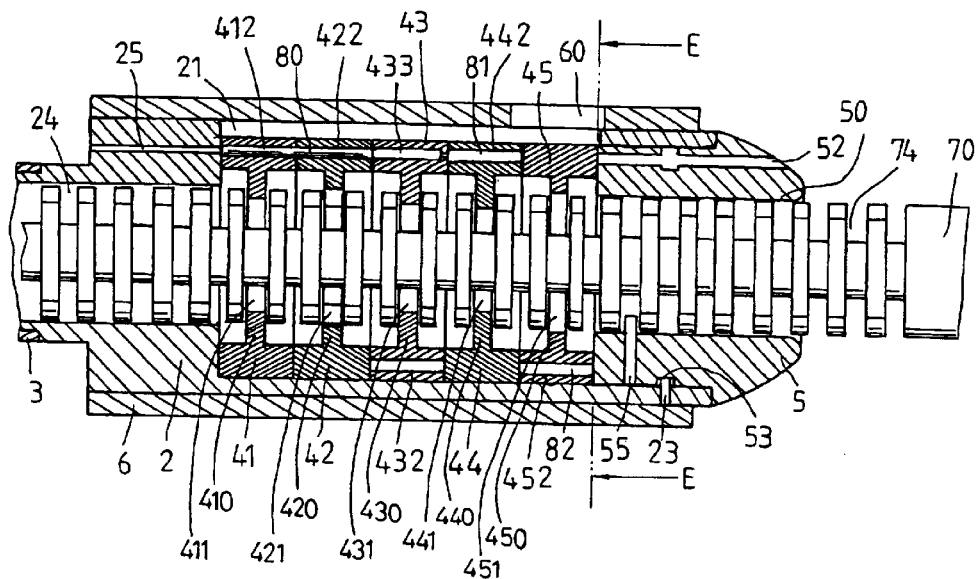
FIG. 12 is a cross-section view showing a long pin and two short pins being inserted into the pin holes in the rotary blocks.
Figure 13:
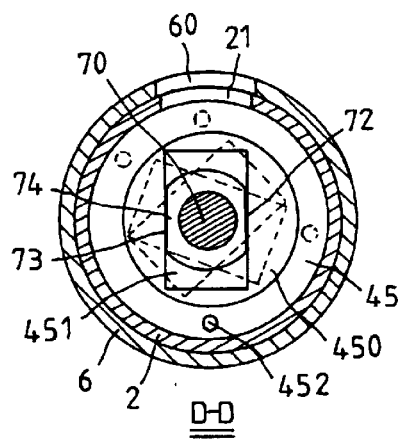
FIG. 13 is a cross-section view of the lock mount along the E—E cut line according to FIG. 12.
Figure 14:
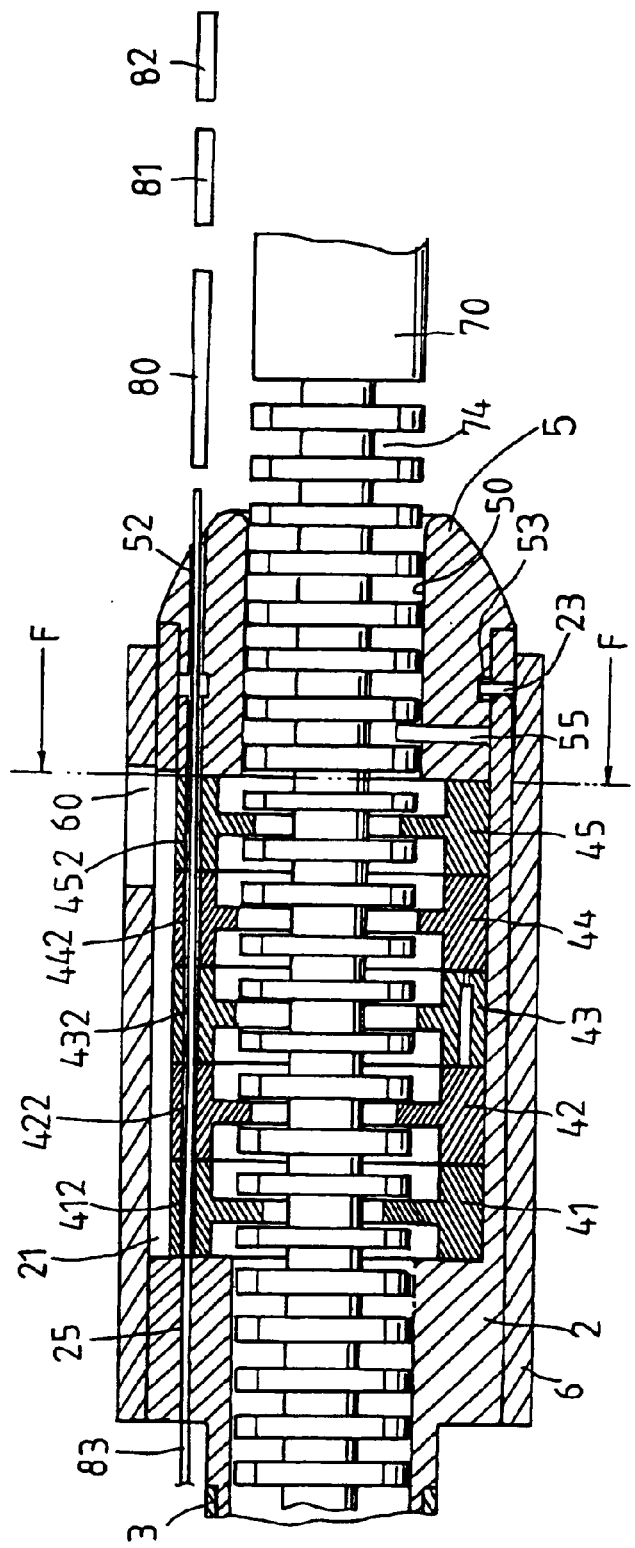
FIG. 14 illustrates the pin holes on the rotary blocks being aligned and the ejection pin is inserted to eject the long pin and short pins.
Figure 15:
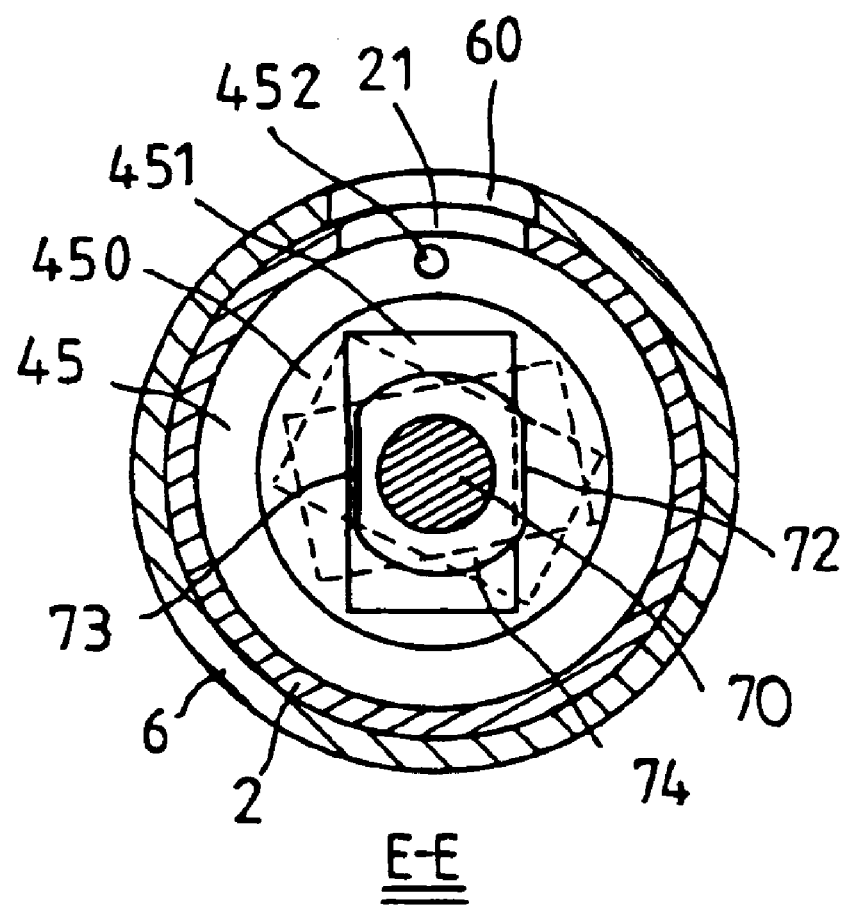
FIG. 15 is a cross-section view of the lock mount along the F—F cut line according to FIG. 14.

For an even better anti-theft function, a user may insert a long pin 80 and two short pins 81 and 82 into the pin holes 412, 422, 442 and 452, as shown in FIGS. 3 and 5. The combination lock 4 is firstly adjusted to a predetermined set of pin codes, by which the pin holes 412, 422, 432, 442 and 452 are mutually aligned. The long pin 80 is inserted through the pin hole 52 of the lock knob 5 into the pin holes 412 and 422, and the rotary block 41 is rotated to drive the long pin 80 so the rotary block 42 is accordingly rotated. The rotary block 43 is then rotated so that the pin hole 432 is aligned with the pin holes 442 and 452 no more. Two short pins 81 and 82 are respectively inserted into the pin hole 442 of the rotary block 44 and the pin hole 452 of the rotary block 45. The rotary blocks 44 and 45 are randomly rotated so that the pin holes therein are aligned no more, as shown in FIGS. 12 and 13. The locking mechanism of the pin set 8 is thus completed. The design of the pin set 8 is to prolong the time a thief needs to decode the steering wheel lock, so that an automobile that has parked for a long time can be safe. To open the steering wheel lock having the long pin 80 and two short pins 81 and 82 inside, the pin holes 412, 422, 432, 442 and 452 have to be mutually aligned. And, further, the aligned pin holes have to be aligned with the pin hole 52 of the lock knob 5 and the through hole 25 of the lock mount 2. An ejection pin 83 is then inserted into the through hole 25 of the lock mount 2 to eject the pin set 8 from the pin holes through the pin hole 52 of the lock knob 5, as shown in FIGS. 14 and 15. The aligned angular positions of the pin holes 412, 422, 432, 442, 452, the pin hole 52 of the lock knob 5 and the through hole 25 of the lock mount 2 must be known to withdraw the long pin 80 and two short pins 81 and 82. Suppose a thief properly align the through hole 25 and the pin holes 412 and 422, the ejection pin 83 can be inserted into the through hole 25 to push the long pin 80 in the pin holes 412 and 422 toward the rotary block 43. However, since the rotary block 43 is distributed with a plurality of stepped false pin holes 433, the long pin 80 engaged with one of the false pin holes 433 moves a little along the hole and get blocked at the other end. Without knowing the long pin 80 being trapped in a false pin hole 433, the thief continues to rotate the rotary block 43, and the insertion of the long pin 80 into the rotary block 43 drives the rotary blocks 41 and 42 together, prohibiting separate rotation of the rotary blocks and therefore not being able to align those eccentric holes 411, 421, 431, 441 and 451. This makes the decoding of the steering wheel lock more difficult, effectively deterring thieves.

Figure 10:
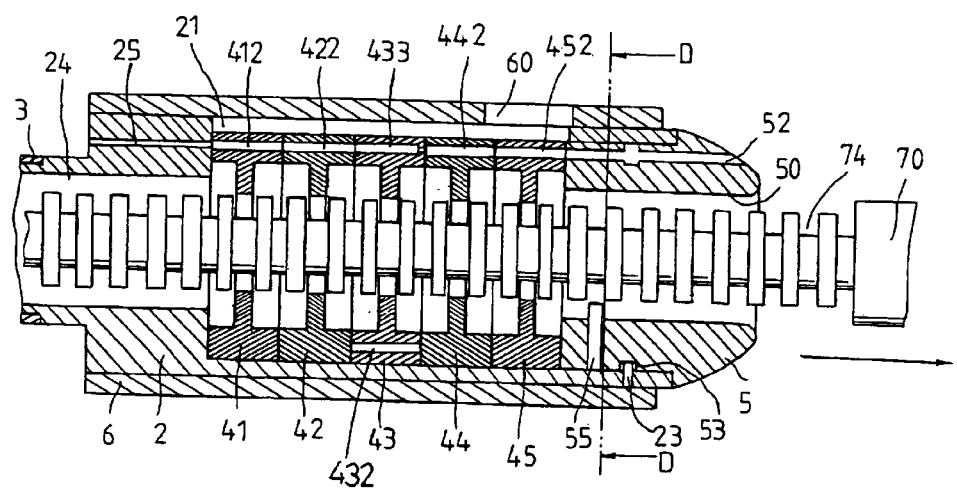
FIG. 10 is a cross-sectional view of the present invention wherein both the rotary blocks and the lock knob are aligned.
Figure 11:
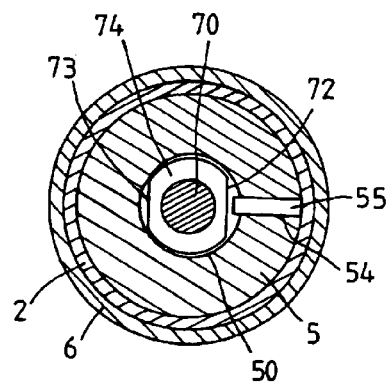
FIG. 11 is a cross-section view of the lock mount along the D—D cut line according to FIG. 10.

To unlock the steering wheel lock, the rotary blocks of the combination lock 4 are turned to predetermined angular positions, so that the pin holes 412, 422, 432, 442 and 452 are mutually aligned, and, further, the aligned pin holes are aligned with the pin hole 52 of the lock knob 5 and the 25 of the lock mount 2. An ejection pin 83 is then inserted into the through hole 25 of the lock mount 2 to eject the pin set 8 from the pin holes through the pin hole 52 of the lock knob 5, as shown in FIGS. 14 and 15. After that, the rotary blocks can be rotated independently, so that they can be adjusted according to a predetermined open code, under which the eccentric holes 411, 421, 431, 441 and 451 are mutually aligned, as shown in FIGS. 8 and 9. The numeric mark 51 of the lock knob 5 is then aligned with the positioning mark 26 of the lock mount 2 to have the fixing pin 55 of the lock knob 5 departed from an annular groove 74 the retractable rod 7 to the wide lateral face 72 thereof, as shown in FIGS. 10 and 11. The retractable rod 7 therefore can move backward into the lock mount 2 to complete the unlocking action. The ingrowing plates 410, 420, 430, 440 and 450 are provided with a rectangular eccentric holes 411, 412, 431, 441 and 451. The rod member 70 of the retractable rod 7 is also eccentric, having a wide lateral face 72 and a narrow lateral face 73 opposite to each other. The eccentricity of the eccentric holes 411–451 and the rod member 70 is to prevent a situation that a rotary block turns 180 degrees from the predetermined angular position and is still blocked by the ingrowing plates 410, 420, 430, 440 and 450.

According to the preferred embodiments, the present invention is advantageous in: (1) multiple locking mechanisms for attaining a better anti-theft effect; (2) no need for a key; (3) an additional pin set for prolonging the operation time of a thief.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A steering wheel lock comprising:

a lock mount provided with a receptacle and a window, a first pin hole for receiving a retaining pin being further provided at an open first end of the lock mount, a first through hole connecting the receptacle being formed at a closed second end of the lock mount, a mark being formed on an outer lateral wall of the lock mount at the open first end;

a retaining rod substantially mounted on the second end of the lock mount, the retaining rod consisting of a first rod member and a first hook member, a second through hole being formed within the rod member;

a combination lock mounted within the lock mount being composed of a plurality of rotary blocks, each of the rotary blocks being provided with an ingrowing plate having a third through hole whose center is slightly off the center of the corresponding rotary block, a set of numeric marks being formed around an outer round wall of each of the rotary blocks;

a lock knob provided with a fourth through hole being mounted on the first end of the lock mount, a numeric mark set being provided on a lateral side of the lock knob about the fourth through hole, an annular groove being formed around an outer round wall of the lock knob, a second pin hole going into the fourth through hole for receiving a fixing pin being formed on the outer round wall of the lock knob; and, a retractable rod going through the lock mount into the retaining rod consisting of a second rod member and a second hook member, the second rod member having a wide lateral face and a narrow lateral face and therefore a non-symmetrical cross-section, the second rod member being further provided with a plurality of annular grooves.

2. The steering wheel lock according to claim 1, wherein a side wall of the lock mount is provided with an ejection pin hole; a side wall of the lock knob is provided with a first through pin hole; a second through pin hole is provided to each of the rotary blocks of the combination lock; a false pin hole is provided to each of the first rotary block and the second rotary block; a plurality of stepped false pin holes are formed around a side wall of third rotary block; a pin set comprising a long pin, two short pins and ejection is capable of being inserted though the through pin holes within the rotary blocks.

3. The steering wheel lock according to claim 1, wherein the lock mount is enclosed by a lock sleeve, on which a plurality of windows for viewing numeric marks of the rotary blocks are arranged in an interlaced pattern.

4. The steering wheel lock according to claim 1, wherein an end of the second rod member of the retractable rod is provided with a pin hole for receiving a blocking pin; the blocking pin is for preventing the removal of the retractable rod from the lock mount.

* * * * *